Nov. 1, 1966 H. D. MacDONALD, JR., ETAL 3,282,161
DUAL THRUST CATAPULT EJECTOR
Filed April 2, 1965 2 Sheets-Sheet 2
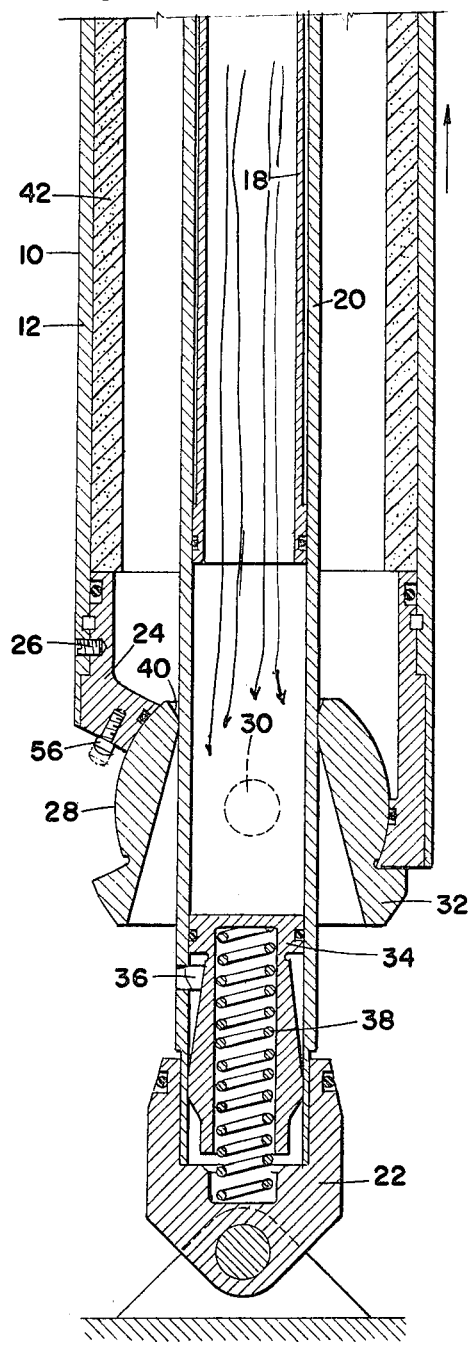
Fig. IA
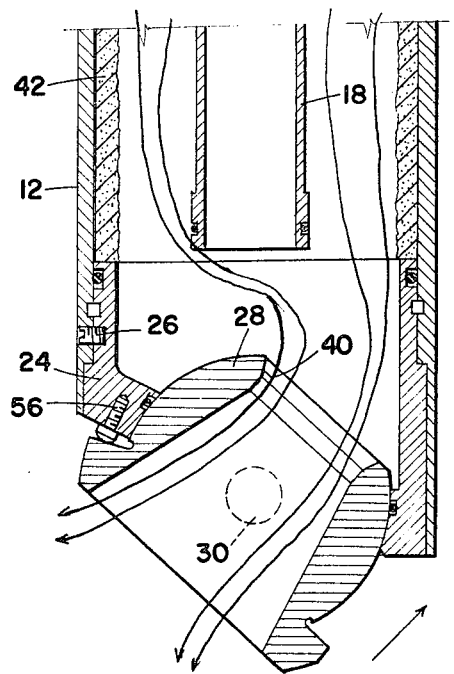
Fig. IB
INVENTORS.
HUGH D. MacDONALD, JR.
NORMAN J. WAECKER
ATTORNEYS 3,282,161
DUAL THRUST CATAPULT EJECTOR
Hugh D. MacDonald, Jr., Palmyra, and Norman J. Waecker, Masonville, N.J., assignors to the United States of America as represented by the Secretary of the Army
Filed Apr. 2, 1965, Ser. No. 445,289
4 Claims. (Cl. 89—1.818)

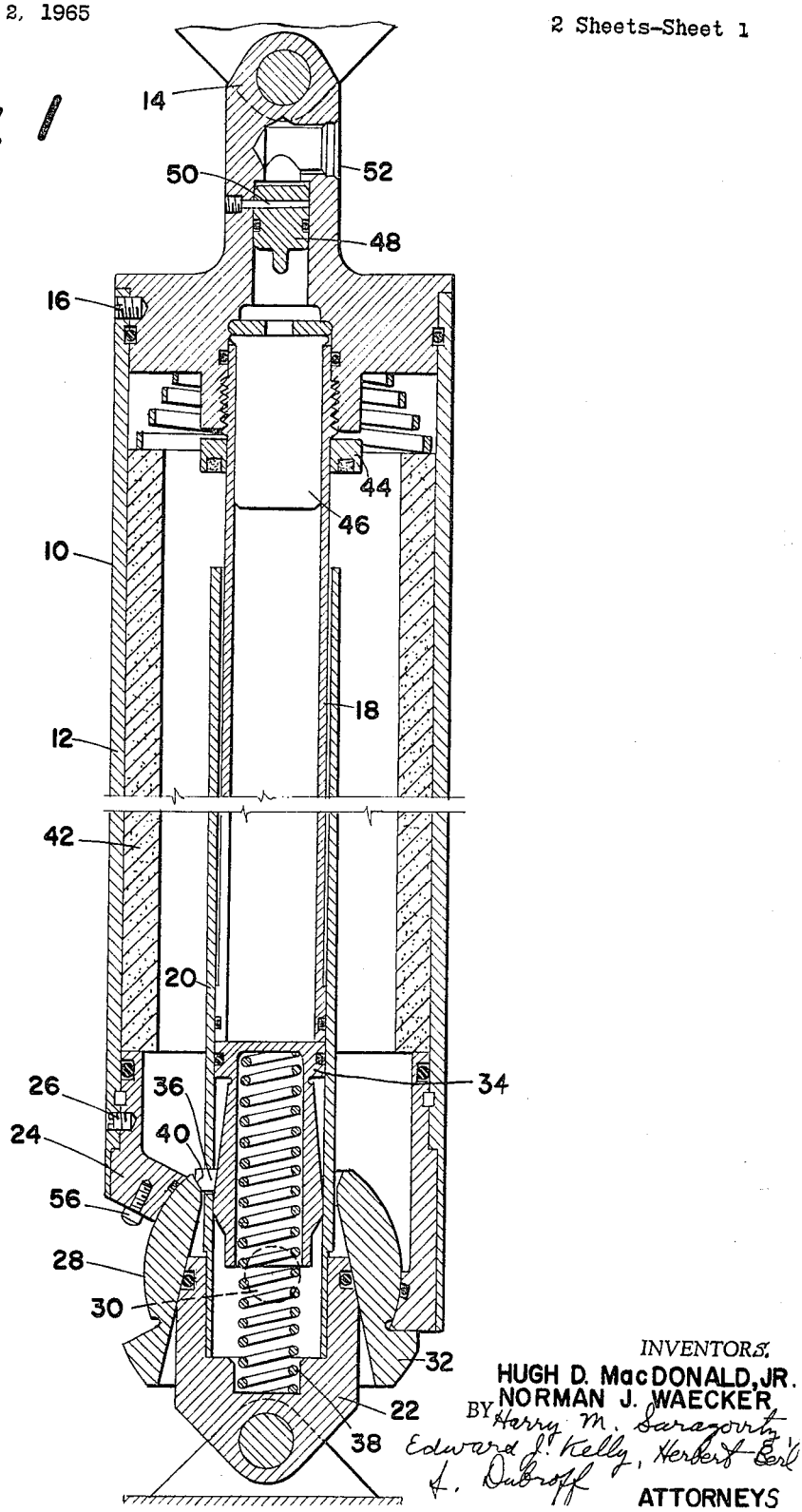

The invention described herein may be manufactured and used by or for the Government for governmental purposes without the payment to us of any royalty thereon.

This invention relates to dual thrust catapult ejectors such as are used to eject a mass from a moving aircraft and more particularly to a catapult ejector which contains a dual purpose rocket nozzle.

It is an object of the present invention to provide a dual thrust catapult ejector of the type which uses the tube action and rocket action principles for ejecting a mass from an aircraft and which contains a single rocket nozzle for assisting the rocket action.

Another object of the present invention is to provide an apparatus of the above type containing a rocket nozzle which is normally oriented in substantially longitudinal alignment with the apparatus during the booster phase of propulsion (i.e. tube action) and oriented with its line of thrust through the center of gravity of the mass being ejected during the sustainer phase of propulsion (i.e. rocket action).

A further object of the present invention is to provide an apparatus of the character described wherein the rocket nozzle is rotatably mounted in the apparatus and constructed and arranged to rotate to the sustainer phase position immediately upon completion of the booster phase of propulsion.

Still another object of the present invention is to provide an apparatus of the character described wherein the rocket nozzle can rotate in only one direction to orient its line of thrust through the center of gravity of the mass being ejected.

A still further object of the present invention of the aforesaid type wherein the rocket nozzle cooperates with pressure responsive elements to provide a locking system for the apparatus during its standby condition.

An additional object of the present invention is to provide an apparatus of the aforesaid type wherein the sustainer phase orientation of the rocket nozzle is adjustable prior to operation of the apparatus.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a sectional view of the catapult ejector of the present invention in its standby condition;

FIGS. 1A and 1B are sections like FIG. 1 illustrating sequential conditions during ejection.

Referring to the drawings wherein like reference numerals relate to like parts 10 is the catapult ejector assembly as a whole having a motor tube or main body 12 and a head member 14 which is attached to a mass (e.g. aircraft seat and man) to be ejected. The member 14 is fixed to the body 12 by means of pins 16 or the like.

A pair of telescoping tubes is contained within the body 12 and is designated as the booster or inner tube 18 and the launch or outer tube 20. The inner tube 18 is fixed to the head member 14, thus forming an integral unit with the main body 12. The outer tube 20 is removable from the main body 12 and extends to a point beyond the lowermost portion of the assembly 10. Integrally fixed with the outer tube 20 and forming the lower end thereof is a member 22 for attachment of the assembly 10 to an aircraft. The number 22 is fixed to the outer tube 20 by a thread or by a suitable force fit and locked thereto.

The lower end of the main body 12 consists of a nozzle housing 24 fixedly arranged therewith by means of pins 26 or the like. A rocket nozzle 28 is rotatably mounted within the nozzle housing 24 by means of trunnion pins 30. The throat of the nozzle 28 is bored slightly eccentrically to the nozzle block 32 for reasons which will be shown further on in this description. The throat of the nozzle 28 is, however, longitudinally aligned with the main body 12 during standby condition as shown in FIG. 1. In order to maintain continuity of description of this embodiment of the present invention complete description of the rotatable nozzle 28 will be postponed until a later point herein.

The outer tube 20 and the main body 12 are locked together by means of a plunger or cam member 34 cooperating with a key 36, both in turn in operative relationship with the nozzle 28 and nozzle housing 26, all in combination coacting to, in essence, lock the catapult-ejector assembly 10 to an aircraft during standby condition. The cam member 34 is longitudinally positioned within the outer tube 20 and is fixed in a desired position by a helical coil spring 38 having one end disposed in a suitable longitudinal recess in the cam member 34 and the other end fixed inside the member 22 such that the spring 38 resists movement of the cam member 34 downwardly towards the member 22. The spring 38 is preferably in its free length orientation so as not to urge an upwardly directed force on the cam member 34. The cam member 34 cooperates with a key 36 which passes through an opening in the outer tube 20. The key 36 is shaped at one end to move smoothly along the contour of the cam member 34 surface, and at its other end (i.e. the end without the outer tube 20) to conform to and complement the surface of the upper end 40 of the nozzle 28. The nozzle 28 thus acts to restrain the movement of the key 36 during standby and also acts to insure that the key 36 falls away into a recess provided therefor by the cam member 34 in accordance with its contour. This will become clearer further on in the course of this description. The lower end portion of the nozzle 28 has a part of its block 32 shaped to mate with a complementary part of the lower end of the nozzle housing 24. This is illustrated in FIG. 1 as 32a and 24a. Thus, as is readily seen, the coaction of the spring 38 urged cam member 34, the key 36, the upper end 40 of the nozzle 28, and the nozzle 28 and nozzle housing 24 at 32a and 24a serves to lock the catapult ejector assembly 10 to an aircraft when the member 22 is attached thereto. The cooperation between the nozzle 28 and nozzle housing 24 at 32a and 24a also serves another function, which is, to limit the nozzle to unidirectional rotation as will be fully described later herein.

A solid propellant 42 is disposed within the body and produces gases for the rocket action during the sustainer phase of propulsion. The propellant 42 is ignited when the auxiliary igniter 44 is fired by the hot gases produced by ignition of the propellant of the cartridge 46. The cartridge 46 is disposed in the upper end portion of the inner tube 18. Means are provided for firing the cartridge 46 and are illustrated as a firing pin 48 which is anchored to the head member 14 by a shear pin 50 and is actuated by a gas applied under pressure through an inlet port 52. The firing pin 48 is arranged to strike a primer 54 which in turn will act to ignite the propellant in the cartridge 46. Obviously the cartridge may be fired electrically, mechanically or in any conventional manner.

Seal rings are provided at appropriate points to prevent propellant gas leakage to enhance clarity in the drawings as well as in this description the seals are not numbered. However, the placement of the seals, as shown, would be obvious to one skilled in this particular art.

In operation of the illustrated embodiment of this invention, the cartridge 46 is fired as previously described and, accordingly, gases under pressure are generated. The inner tube 18 extends to a position in close proximity with the cam member 34, thus the cartridge gases act only thereon and so act to urge the cam member 34 downwardly against the force of the spring 38. The key 36 is then displaced into the recess provided between the inner wall of the outer tube 20 and the surface of the cam member 34 as contoured. The main body 12 is free to move upwardly—the booster phase of propulsion (the tube action of the catapult ejector 10) is, hence, commenced. The extent of the tube action is determined by the length of the outer tube 20. As shown in FIG. 1A the cartridge 46 gases continue to travel down the inner tube 18 and the outer tube 20 and proceed through the nozzle 28 which is precluded from rotating by the outer tube 20.

The booster phase of propulsion (tube action) is completed when lower end of this inner tube 18 passes the upper end of the outer tube 20. The cartridge 46 gases are now directed into the main body 12 and act to fire the auxiliary igniter 44 which in turn fires the propellant 42. At this stage the sustainer propulsion phase or rocket action has commenced. The propellant 42 gases act on the nozzle 28 to rotate it to the position shown in FIG. 1B. As previously described the throat of the nozzle 28 is bored eccentrically to the nozzle block 32, such that the nozzle will rotate to the position as shown. An adjustable stop 56 is threaded into a portion of the nozzle housing 24, and is positioned so that the final position of the nozzle 28 is determined thereby. As is well understood, the nozzle 28 should be canted during rocket action so that the line of thrust of the gases passing through the nozzle 28 passes through or substantially near the center of gravity of the mass being ejected. The stop 56 determines when the above relationship exists. Since this stop 56 is adjustable its position can be varied to accommodate various masses having different centers of gravity. The specific center of gravity of the mass to be ejected can be readily determined and the stop 56 positioned accordingly. This adjustable line of thrust during the rocket action has never been provided before. Rather, the nozzle cant angle was fixed and any significant change in center of gravity of a mass to be ejected would necessarily require a new nozzle to accommodate the change.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. In a dual thrust catapult ejector for use in an aircraft for ejecting a mass therefrom the combination of
   an elongate body comprising a nozzle housing at the lower end thereof;
   means on the upper end of said body for attaching same to a mass to be ejected;
   a pair of inner and outer telescoping tubes within said body, said inner tube fixed to said body and said outer tube removable from said body;
   means on said outer tube for attachment to an aircraft;
   means separably locking said outer tube and said body together;
   means including a cartridge for releasing said locking means and for initially propelling said body;
   a propellant within said body ignited by the gases of said cartridge for propelling said body after said body has separated from said outer tube;
   a nozzle element rotatably received in said nozzle housing, in substantially longitudinal alignment with said body during initial propelling of said body, said nozzle element being constructed and arranged to rotate to a fixed position when said body separates from said outer tube to exhaust propellant gases angularly to the longitudinal axis of said body to produce a component of thrust through the mass to be ejected.

2. In a dual thrust catapult ejector for use in an aircraft for ejecting a mass therefrom, the combination of
   an elongate body comprising a nozzle housing at the lower end thereof;
   means on the upper end of said body for attaching same to a mass to be ejected;
   a pair of inner and outer telescoping tubes within said body, said inner tube fixed to said body and said outer tube removable from said body;
   means on said outer tube for attachment to an aircraft;
   a nozzle element rotatably received in said nozzle housing, in substantially longitudinal alignment with said body, said nozzle being constructed and arranged to rotate to a fixed position when urged by a predetermined force whereby said nozzle will exhaust propellant gases angularly to the longitudinal axis of said body to produce a component of thrust passing through the mass to be ejected;
   means on said nozzle element cooperating with said nozzle housing for permitting only unidirectional rotation of said nozzle element;
   pressure responsive locking means cooperating with said nozzle element for separably locking said outer tube and said body together, said locking means being adapted to release said body from said outer tube upon the development of a predetermined pressure within said body;
   a cartridge for providing pressurized gases for releasing said locking means and for initially propelling said body; and
   a propellant within said body ignited by the gases of said cartridge for propelling said body after said body has separated from said outer tube.

3. In a dual thrust catapult ejector for use in an aircraft for ejecting a mass therefrom, the combination of
   an elongate body comprising a nozzle housing at the lower end thereof;
   means on the upper end of said body for attachment to a mass to be ejected;
   a pair of inner and outer telescoping tubes within said body, said inner tube fixed to said body and said outer tube removable from said body;
   means on said outer tube for attachment to an aircraft;
   a cartridge in said inner tube for providing pressurized gases for initially propelling said body;
   a nozzle element rotatably received in said nozzle housing and oriented to downwardly exhaust cartridge gases until said body has separated from said outer tube, said nozzle element being constructed and arranged to rotate to a fixed position when urged by a predetermined force whereby said nozzle element will exhaust propellant gases angularly to the longitudinal axis of said body to produce a component of thrust passing through the mass to be ejected, said nozzle element lower end cooperating with said nozzle housing lower end for permitting only unidirectional rotation of said nozzle element;
   a key member contacting a portion of the upper end surface of said nozzle element and passing through an opening in said outer tube;

a pressure responsive cam member in said outer tube cooperating with said key member to lock said tube and said body together, said cam member being so constructed that a predetermined pressure directed towards the lower end of said body will urge said key member within said outer tube thereby releasing said body from said outer tube; and a propellant within said body ignited by the gases of said cartridge for propelling said body after said body has separated from said outer tube.

4. A catapult ejector as set forth in claim 3 including adjustable means on said nozzle housing for regulating the fixed position of said nozzle element with respect to said body when said nozzle element has been rotated after said body has separated from said outer tube.

References Cited by the Examiner
UNITED STATES PATENTS 3,034,289   5/1962   Stott et al. _____ 60—26.1

BENJAMIN A. BORCHELT, *Primary Examiner.*

S. W. ENGLE, *Assistant Examiner.*